May 10, 1960     A. E. GIGUERE     2,935,810

FISHING HOOK SPREADER DEVICE

Filed June 21, 1957

INVENTOR.

Albert E. Giguere

WITNESS - Peter Begin

United States Patent Office 2,935,810
Patented May 10, 1960

2,935,810

FISHING HOOK SPREADER DEVICE

Albert E. Giguere, New York, N.Y.

Application June 21, 1957, Serial No. 667,091

2 Claims. (Cl. 43—42.74)

My invention relates in general to an item of fishing tackle and more specifically to a spreader device adapted to permit the use of two snelled fishing hooks attached to any fishing line at the same level or at various levels on the same line restricting interference with each other and the line itself.

A primary object of this invention is to provide a spreader device embodying new developments over the prior art to more positively direct the two hooks away from each other and the centered line, thus preventing entanglement while casting, unhooking a caught fish, lowering to fishing level and to resist the entangling effects of moving currents in water.

A further object of this invention is to provide means for quickly and easily attaching or detaching hooks.

A further object of this invention is to provide cushioning effect to the shock delivered to soft and live bait while casting.

A further object of this invention is to provide a spreader device which is rust and corrosion proof, durable and adaptable to repeated and varied use.

A further object of this invention is to provide a spreader device of one-piece, streamlined construction to eliminate corners, sharp edges and protruding metallic points.

A further object of this invention is to provide a spreader device offering more positive direction of the fishing hooks away from each other in action.

A further object of this invention is to provide a spreader device which will more positively direct the free hook away from the one from which the angler is unhooking a caught fish.

A further object of this invention is to provide a spreader device flexible enough and constructed so as to conform readily to a straight line of pull from hook to line connection.

A further object of this invention is to provide a spreader device which will at all times retain a high degree of memory to original shape and position on the line.

A further object of this invention is to provide a spreader device which can be easily and economically manufactured.

A further object of this invention is to provide a spreader device of such small dimensional construction and high tensile strength as to permit broader use.

A further object of this invention is to provide a spreader device which will permit use in multiples at various levels on the same fishing line.

A further object of this invention is to provide a spreader device of such construction as to permit use of a material which will afford a certain degree of camouflage while submerged.

The foregoing advantages will become apparent upon consideration of the following description together with accompanying drawings indicating the simplicity and efficacy of the device.

Figure 1:
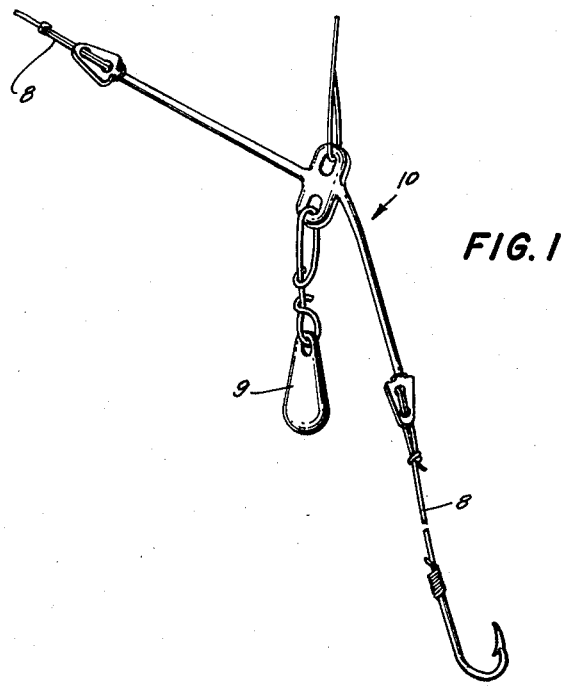
Fig. 1 is a diagrammatic view, illustrating the use of one of my improved devices, with parts of the construction broken away.

In illustrating one adaptation and use of my invention, I have shown, in Fig. 1, at 8 part of the snells of two hooks and at 9 a sinker attachment. 10 represents one of my improved spreader devices.

Figure 2:
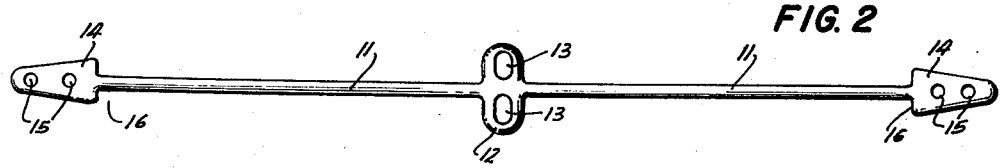
Fig. 2 is a plan view of the device of Fig. 1 detached and on an enlarged scale.
Figure 3:
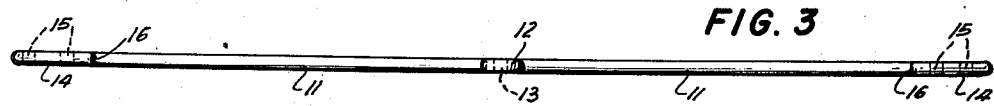
Fig. 3 is a side view of the device, as seen in Fig. 2.

Considering now Figs. 2 and 3 of the drawing, it will appear that the device comprises a flexible and resilient normally straight spreader arm or rod 11 of suitable plastic material, having an enlarged central body portion 12 normally lying in the plane of the arm, as viewed in Fig. 3. The body portion 12 has, at its ends, apertures 13, one for the attachment of the fish line, as noted in Fig. 1, and the other for the attachment of the sinker 9.

At the ends of the rod 11 are dart-shaped enlarged portions 14, each having a pair of apertures 15 therein, the portions 14 forming shoulders, at their inner ends, as seen at 16, and, here again, the portions 14 normally are in the plane of the rod 11, as viewed in Fig. 3 of the drawing.

Figure 4:
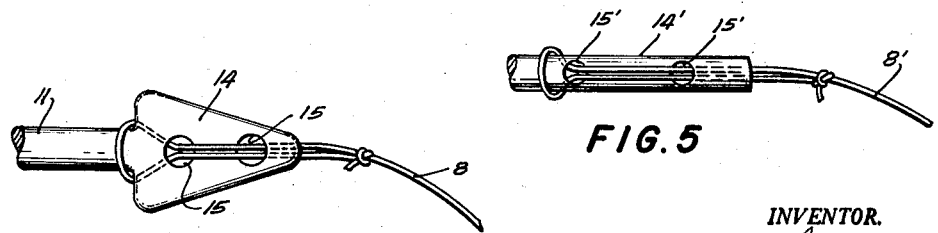
Fig. 4 is an enlarged view of one end portion of the device, clearly illustrating the attachment of a hook snell therewith.

Considering Fig. 4 of the drawing, it will appear that the looped end of the snells 8 are coupled with the enlarged portions, with the loop positioned at the shoulder portions and the strands of the loop extending through the spaced apertures 15.

Figure 5:
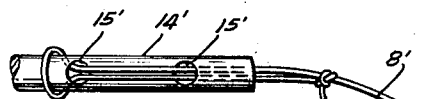
Fig. 5 is a view, similar to Fig. 4, showing a modification.

In Fig. 5 of the drawing is shown a modification, where the enlargements 14 are dispensed with and the rod ends, as at 14', have spaced apertures 15' receiving the loop of a snell 8', providing a simplified form of attachment.

From the foregoing, it will be seen that I have provided a new and improved spreader device embodying the element of extreme simplicity which will serve to more positively prevent two fishing hooks from entanglement with each other or the line under all conditions, either in or out of the water, whether casting, submerged or while unhooking a caught fish.

Although this invention has been described as to specific embodiment, it should be understood that various modifications and altered details of construction might be employed without departing from the main principles of the invention and the scope of the annexed claims.

In full consideration of the prior art I do claim as new and desire to secure by Letters Patent on the following improvements:

1. The combination of a spreader device and snelled hooks of the character described, said device comprising a lightweight normally straight, flexible rod of resilient material, a laterally enlarged central body portion extending at opposite sides of said rod, said body portion, at both sides of the rod, having elongated apertures in close proximity to the rod for attachment of a line and a sinker, free end portions of the rod being laterally enlarged to form members, said rod, central body and members being all of substantially the same thickness throughout each of said members having pairs of apertures in axial alinement with the rod for attachment of said snelled hooks, the rod, between said central body portion and members, being of one diameter, round, cross-sectional form, and the straight rod normally disposing the longitudinal center of said members in alinement with the center of said central body portion, the snell of each hook being provided with a loop at its attaching end, each loop encompassing said rod inwardly of said apertures and then threaded in an outwardly direction thru the pair of apertures in each member.

2. A structure as defined in claim 1, wherein said members are contracted outwardly, and inner, wider ends of said members form shoulder portions disposed substantially at right angles to the longitudinal axis of said rod.

References Cited in the file of this patent

UNITED STATES PATENTS

| | | |
|---|---|---|
| 1,153,053 | Forster | Sept. 7, 1915 |
| 2,218,946 | Barnett | Oct. 22, 1940 |
| 2,223,922 | Schofield | Dec. 3, 1940 |
| 2,231,616 | Constantino | Feb. 11, 1941 |
| 2,390,584 | Hardin | Dec. 11, 1945 |
| 2,766,547 | Gallager | Oct. 16, 1956 |

FOREIGN PATENTS

| | | |
|---|---|---|
| 67,128 | Norway | Nov. 29, 1943 |